(12) United States Patent
Yonemura et al.

(10) Patent No.: US 10,767,508 B2
(45) Date of Patent: Sep. 8, 2020

(54) GAS EXPANDER

(71) Applicant: MITSUBISHI HEAVY INDUSTRIES COMPRESSOR CORPORATION, Tokyo (JP)

(72) Inventors: Naoto Yonemura, Hiroshima (JP); Daisuke Hirata, Hiroshima (JP); Hirotaka Higashimori, Nagasaki (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 269 days.

(21) Appl. No.: 15/771,060

(22) PCT Filed: Feb. 9, 2016

(86) PCT No.: PCT/JP2016/000654
§ 371 (c)(1),
(2) Date: Apr. 25, 2018

(87) PCT Pub. No.: WO2017/138035
PCT Pub. Date: Aug. 17, 2017

(65) Prior Publication Data
US 2018/0320546 A1 Nov. 8, 2018

(51) Int. Cl.
*F01D 25/04* (2006.01)
*F01D 9/02* (2006.01)
(Continued)

(52) U.S. Cl.
CPC .............. *F01D 25/04* (2013.01); *F01D 1/08* (2013.01); *F01D 9/02* (2013.01); *F01D 25/30* (2013.01);
(Continued)

(58) Field of Classification Search
CPC combination set(s) only.
See application file for complete search history.

(56) References Cited

U.S. PATENT DOCUMENTS 3,116,908 A 1/1964 Wosika
3,937,013 A 2/1976 Aspinwall
(Continued)

FOREIGN PATENT DOCUMENTS

JP H06-173707 A 6/1994
JP H07-035091 A 2/1995
(Continued)

OTHER PUBLICATIONS

International Preliminary Report on Patentability issued in corresponding International Appplication No. PCT/JP2016/000654 dated Aug. 23, 2018 (12 pages).

(Continued)

*Primary Examiner* — Kenneth Bomberg
*Assistant Examiner* — Adam W Brown
(74) *Attorney, Agent, or Firm* — Osha Liang LLP

(57) ABSTRACT

A gas expander includes: a casing where a swirl chamber for a gas to be expanded is formed; a turbine wheel that is housed in the casing and rotationally driven by the expanded gas; a diffuser that is mounted to the casing in a direction of a rotating shaft of the turbine wheel and includes a flow path for the expanded gas to flow in the direction of the rotating shaft; a swirl stopper that is disposed in the diffuser, faces a downstream front end surface of a boss of the turbine wheel that faces the flow path, and includes a closed swirl stopping surface that is disposed to face the downstream front end surface of the boss with a gap between the closed swirl stopping surface and the downstream front end surface; and a swirl preventing plate that circumferentially partition the flow path in the diffuser.

16 Claims, 5 Drawing Sheets

(51) Int. Cl.
  F01D 25/30 (2006.01)
  F02C 1/04 (2006.01)
  F02K 1/40 (2006.01)
  F01D 1/08 (2006.01)

(52) U.S. Cl.
  CPC ............... F02C 1/04 (2013.01); F02K 1/40 (2013.01); *F05D 2220/30* (2013.01); *F05D 2240/12* (2013.01); *F05D 2240/128* (2013.01); *F05D 2240/24* (2013.01); *F05D 2260/96* (2013.01)

(56) References Cited

U.S. PATENT DOCUMENTS

| | | | | |
|---|---|---|---|---|
| 3,994,620 | A * | 11/1976 | Spraker, Jr. | F01D 17/105 |
| | | | | 415/145 |
| 5,338,155 | A | 8/1994 | Kreitmeier | |
| 8,776,527 | B1 * | 7/2014 | Sokhey | F02K 1/825 |
| | | | | 60/770 |
| 8,925,330 | B2 * | 1/2015 | Britchford | F01D 17/105 |
| | | | | 415/114 |
| 9,353,765 | B2 * | 5/2016 | Haley | F04D 29/4213 |
| 9,359,900 | B2 * | 6/2016 | Chengappa | F01D 5/145 |
| 9,810,079 | B2 * | 11/2017 | Manning | F01D 9/02 |
| 10,233,779 | B2 * | 3/2019 | Wilkins | F01D 25/24 |
| 2011/0232291 | A1 * | 9/2011 | Luedke | F01D 25/30 |
| | | | | 60/771 |
| 2013/0152592 | A1 * | 6/2013 | Orosa | F01D 25/305 |
| | | | | 60/772 |
| 2013/0330186 | A1 * | 12/2013 | Subramaniyan | F01D 5/145 |
| | | | | 415/211.2 |
| 2014/0137533 | A1 * | 5/2014 | Subramaniyan | F01D 25/30 |
| | | | | 60/39.5 |
| 2015/0167693 | A1 * | 6/2015 | Yamasaki | F01D 5/143 |
| | | | | 415/211.2 |
| 2016/0245119 | A1 * | 8/2016 | Wilkins | F01D 25/24 |

FOREIGN PATENT DOCUMENTS

| | | |
|---|---|---|
| JP | H07-102997 A | 4/1995 |
| JP | 2012-177357 A | 9/2012 |
| JP | 2013-170486 A | 9/2013 |
| JP | 2016-003584 A | 1/2016 |
| WO | 2014/034643 A1 | 3/2014 |

OTHER PUBLICATIONS

International Search Report issued in corresponding International Application No. PCT/JP2016/000654 dated Apr. 26, 2016 (2 pages).

Higashimori, H., "Inlet Cone Vortex in Centrifugal Fans" Jun. 2009 (7 pages).

Notice of Reasons for Refusal in corresponding Japanese Application No. 2017-566232, dated Apr. 11, 2019 (10 pages).

* cited by examiner

GAS EXPANDER

TECHNICAL FIELD

The present invention relates to a technology for reducing vibration of a gas expander.

BACKGROUND

Various types of fluid machines, for example, a compressor for compressing a gas or an expander for expanding a gas instead have been used. The fluid machines generate vibration due to a flow of the compressed or expanded gas.

For example, Patent Literature 1 proposes providing a straightening vane for controlling a swirl flow of a compressed fluid in a discharge pipe connecting a centrifugal compression mechanism and a work apparatus provided downstream. Patent Literature 1 describes that providing the straightening vane controls the swirl flow of the fluid, and reduces vibration in an entire flow rate region from a low flow rate region to a high flow rate region.

PATENT LITERATURE

Patent Literature 1: JP 7-35091 A

SUMMARY

The straightening vane disclosed in Patent Literature 1 controls the swirl flow to exert a certain effect on reduction in vibration. However, the inventors have studied a gas expander, and found that there is still a room for improvement in reduction in vibration.

The gas expander and the centrifugal compression mechanism disclosed in Patent Literature 1 are similar in including a turbine wheel and a casing for housing the turbine wheel. However, in the gas expander, a gas having been expanded when passing through a swirl chamber flows through a turbine wheel to an outlet side, while in the centrifugal compressor, a gas having been compressed when passing through a swirl chamber flows through a turbine wheel to an outlet side. As such, a direction of a gas flow in the gas expander is reverse of that in the centrifugal compressor, and thus it is understood that only the straightening vane cannot sufficiently reduce vibration of the gas expander.

Accordingly, one or more embodiments of the present invention provide a gas expander with further reduced vibration.

A gas expander according to one or more embodiments of the present invention includes: a casing in which a swirl chamber is formed, a gas to be expanded passing through the swirl chamber; a turbine wheel that is housed in the casing and rotationally driven by the gas acting on the turbine wheel, the gas having passed through the swirl chamber; and a diffuser that stands on the casing in a direction of a rotating shaft of the turbine wheel, and has a flow path through which the gas having passed through the turbine wheel flows in the direction of the rotating shaft of the turbine wheel.

The gas expander according to one or more embodiments of the present invention includes: a swirl stopper that is provided in the diffuser and faces a downstream front end surface of a boss of the turbine wheel facing the flow path in the diffuser; and a swirl preventing plate that is provided in the diffuser and circumferentially partitions the flow path.

From the inventors' study, the gas having passed through the turbine wheel and reached the diffuser generates a swirl flow, and the downstream front end surface of the boss of the turbine wheel facing the flow path in the diffuser triggers the swirl flow to vibrate the rotating shaft of the turbine wheel. Thus, in the gas expander according to one or more embodiments of the present invention, the swirl stopper is provided to face the downstream front end surface of the boss of the turbine wheel, thereby preventing the downstream front end surface of the boss of the turbine wheel from triggering the swirl flow.

Also, the gas expander according to one or more embodiments of the present invention includes the swirl preventing plate that circumferentially partitions the flow path in the diffuser, thereby stopping the swirl flow even if generated.

The gas expander in one or more embodiments of the present invention refers to a gas expander including a turbine such as a radial turbine, a diagonal flow water turbine, or an axial turbine as a component.

According to one or more embodiments of the present invention, the swirl preventing plate is provided on a downstream side of the flow path in the diffuser, and in this case, the flow path in the diffuser includes a pressure recovery region on an upstream side and a swirl flow stopping region on the downstream side continuous with the pressure recovery region.

This can stop the swirl flow while ensuring a pressure recovery function of the diffuser.

According to one or more embodiments of the present invention, for the swirl preventing plate, $L31 \geq D10 \times 0.75$ is satisfied, or $L31 \geq D10 \times 1.2$ is satisfied, where D10 is a diameter of an inlet of the flow path in the diffuser, and L31 is a distance from the inlet to an end on the upstream side of the swirl preventing plate.

According to one or more embodiments of the present invention, in the diffuser, the swirl preventing plate is provided such that the end on the upstream side of the swirl preventing plate is away from the inlet to satisfy $A1 \times 1.6 \leq A2$, where A1 is a flow path area at the inlet of the flow path, and A2 is a flow path area at the end on the upstream side of the swirl preventing plate.

A swirl generated at an outlet of the turbine wheel is said to have a swirl length 1.0 to 1.5 times longer than D10. On the other hand, the swirl preventing plate provided to overlap the swirl has a great effect. However, the swirl preventing plate interfering with the swirl may cause pressure loss, which may prevent a sufficient pressure recovery function of the diffuser from being obtained. Thus, the distance L31 from the inlet to the end on the upstream side of the swirl preventing plate is ensured as described above to avoid the interference of the swirl preventing plate with the swirl as much as possible. Also, the pressure recovery function of the diffuser is obtained by the flow path area increasing from the upstream side toward the downstream side. Thus, a ratio above a certain level of the flow path area A2 at the end on the upstream side of the swirl preventing plate to the flow path area A1 at the inlet is ensured so as to be able to maintain a pressure recovery rate of the diffuser.

According to one or more embodiments of the present invention, for the swirl preventing plate, $L35 \geq D10 \times 0.45$ is satisfied, where L35 is an axial dimension of the swirl preventing plate, and D10 is a diameter of the inlet of the flow path in the diffuser.

This can sufficiently ensure a function of the swirl preventing plate.

According to one or more embodiments of the present invention, a plurality of swirl preventing plates radially partitions the flow path in the diffuser. This can sufficiently ensure a function of the swirl preventing plate.

According to one or more embodiments of the present invention, in a case where the swirl stopper includes a cylindrical member provided coaxially with the rotating shaft of the turbine wheel, $D32 \geq D13 \times 0.95$ is satisfied, or $1.2 \times D2 \geq D32 \geq D13 \times 0.95$ is satisfied, where D32 is a diameter of a portion of the swirl stopper facing the downstream front end surface of the boss of the turbine wheel, and D13 is a diameter of the downstream front end surface of the boss of the turbine wheel.

This can more effectively achieve a function of preventing the downstream front end surface of the boss of the turbine wheel from triggering the swirl flow.

According to one or more embodiments of the present invention, in the swirl stopper, a swirl stopping surface that faces the downstream front end surface of the boss of the turbine wheel has a peripheral edge protruding toward the downstream front end surface of the boss of the turbine wheel and an inner side recessed from the peripheral edge, and that the swirl stopper covers the downstream front end surface of the boss of the turbine wheel and an outer peripheral surface of the turbine wheel continuous with the downstream front end surface of the boss.

This can more effectively achieve a function of preventing the downstream front end surface of the boss of the turbine wheel from triggering the swirl flow.

According to one or more embodiments of the present invention, the swirl stopper is secured to the swirl preventing plate and the swirl preventing plate is secured to the diffuser, and thus the swirl stopper can be mounted to a predetermined position of the diffuser via the swirl preventing plate.

The swirl preventing plate is used to mount the swirl stopper to the diffuser. Thus, there is no need to prepare a separate special member for mounting the swirl stopper, and there is no need for a mounting operation using the member, thereby reducing cost including work burden.

According to one or more embodiments of the present invention, a plurality of, typically four, swirl preventing plates radially partition the flow path in the diffuser around the swirl stopper.

In the gas expander according to one or more embodiments of the present invention, the swirl stopper that faces the downstream front end surface of the boss of the turbine wheel is provided to prevent the downstream front end surface of the boss of the turbine wheel from triggering the swirl flow. Also, the gas expander according to one or more embodiments of the present invention includes the swirl preventing plate that circumferentially partitions the flow path in the diffuser, thereby stopping the swirl flow even if generated. From the above, One or more embodiments provide a gas expander with further reduced vibration.

BRIEF DESCRIPTION OF DRAWINGS

FIG. 1A is a vertical sectional view, and FIG. 1B is a cross-sectional of a diffuser shown in FIG. 1A.

DETAILED DESCRIPTION

Now, a fluid machine according to one or more embodiments of the present invention will be described taking a gas expander 1 as an example.

The gas expander 1 is used for sucking and expanding a high pressure gas discharged from, for example, a plant (process) side (hereinafter referred to as a process gas) to convert pressure energy of the gas into speed energy (mechanical energy) to recover power and reduce power of a power source, for example, a drive motor.

Figure 1A:
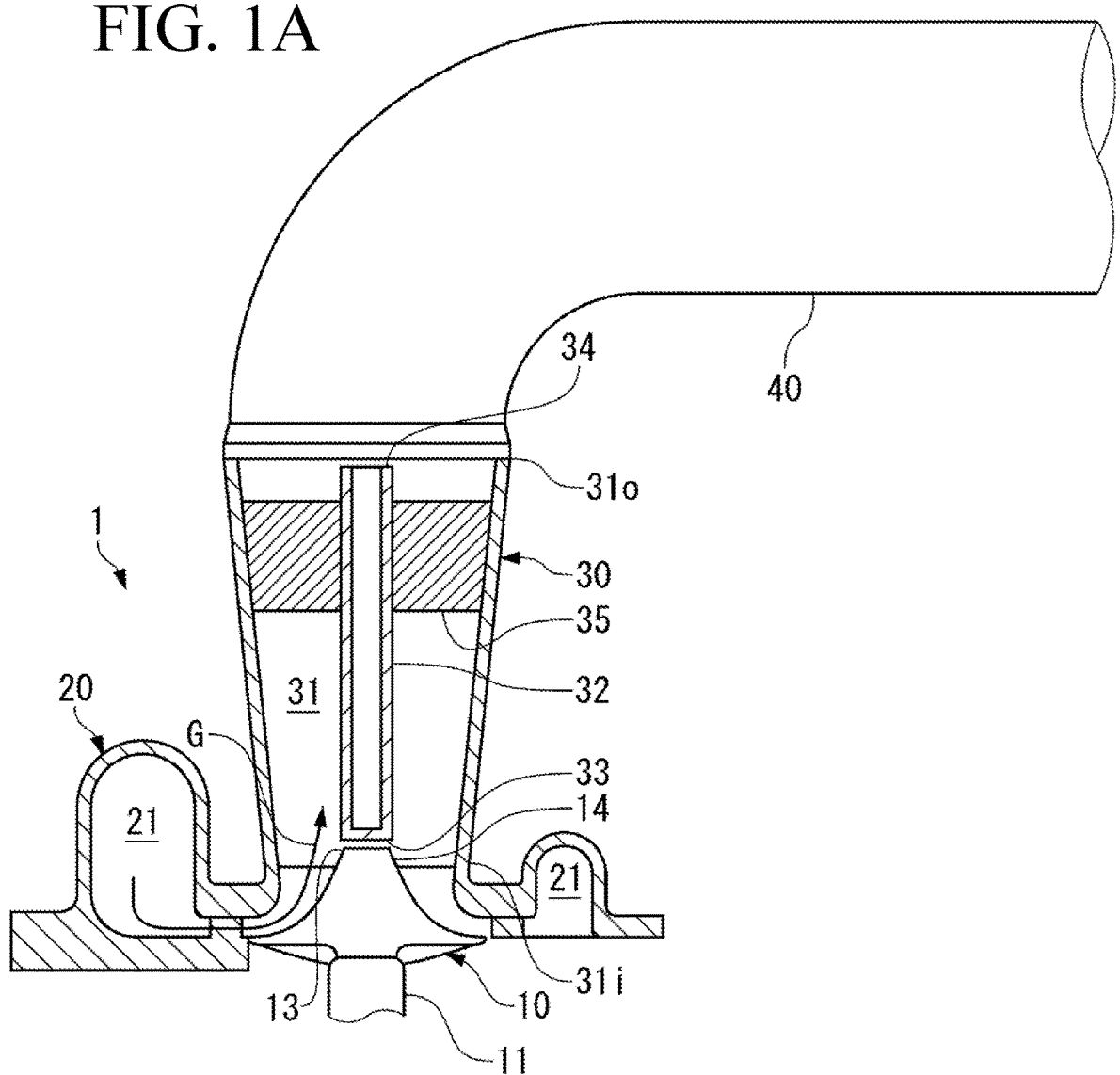
FIG. 1A and FIG. 1B each show a gas expander according to one or more embodiments of the present invention.
Figure 1B:
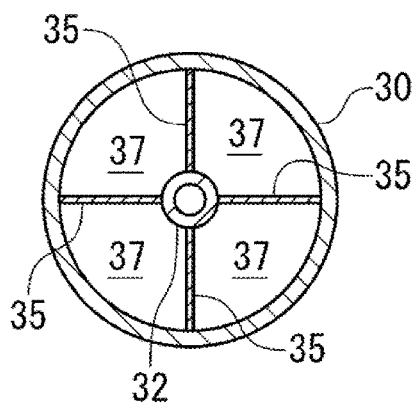

As shown in FIG. 1, the gas expander 1 includes a turbine wheel 10 that receives a process gas G and rotates, and a rotating shaft 11a that rotates integrally with the turbine wheel 10. The rotating shaft 11 is coupled to the power source.

The gas expander 1 includes a casing 20 for housing the turbine wheel 10 therein.

The casing 20 includes a swirl chamber 21 continuous with a suction port (not shown) for introducing the process gas G, and the turbine wheel 10 receives energy of the process gas G having passed through the swirl chamber 21 and is rotationally driven.

The gas expander 1 includes a diffuser 30 into which the process gas G having passed through the turbine wheel is discharged. The diffuser 30 is mounted to the casing 20 in a direction of the rotating shaft 11 of the turbine wheel 10 and coaxially with the rotating shaft 11. The process gas G having passed through the turbine wheel 10 is recovered in dynamic pressure while passing through the diffuser 30, and then discharged into a pipe 40 connecting to the diffuser 30. With reference to a direction of a flow of the process gas G in the gas expander 1, upstream and downstream directions are defined.

The diffuser 30 has an opening area gradually increasing from an inlet 31i of a flow path 31 continuous with an inside of the casing 20 toward an outlet 31o, thereby reducing a flow speed of the passing process gas G to increase and recover pressure.

The diffuser 30 may have any shape such as a conical shape or a semi-spindle shape as long as the diffuser 30 achieves its function.

When the process gas G is discharged into the diffuser 30, a swirl flow is sometimes formed in a certain operation region. If an exciting force caused by the swirl flow exceeds attenuation performance of the turbine wheel 10, the rotating shaft 11 continuous with the turbine wheel 10 is vibrated. The inventors checked distribution of pressure (static pressure) caused by the process gas G at the inlet 31i of the diffuser 30, and differential pressure is created between a center and an outer peripheral side of the diffuser 30 in a certain operation region. The turbine wheel 10 faces the flow path 31 in the diffuser 30, and with high differential pressure, the differential pressure caused by the swirl flow is applied to the entire turbine wheel 10 from the downstream front end surface 14 of the boss 13 of turbine wheel 10. Thus, a circumferential force acts on the rotating shaft 11, and whirling of a direction of the force causes shaft vibration.

The vibration of the rotating shaft 11 may be generated in a partial load operation. Specifically, at a start on the process side, in the partial load operation in which a rated operation is not achieved, the process gas G that does not reach a rated temperature is supplied to the gas expander 1, and a phenomenon of generation of the shaft vibration is observed during an increase in temperature from a temperature at the start to the rated temperature.

At a partial load, a volume flow rate is lower than that near a rated load, which may reduce a flow speed in a blade angle direction at the outlet of the gas from the turbine wheel 10 and increase vibration on a swirl flow side.

In order to prevent or reduce vibration caused by a swirl flow, as shown in FIG. 1, in the gas expander 1 according to one or more embodiments, a swirl stopping cylinder (swirl stopper) 32 and a swirl preventing plate 35 are provided in the diffuser 30. The swirl stopping cylinder 32 and the swirl preventing plate 35 will be described below.

The swirl stopping cylinder 32 is a hollow cylindrical member having a swirl stopping surface 33 as an upstream front end surface and a rear end surface 34, and is provided coaxially with the rotating shaft 11 of the turbine wheel 10. Although an example of using a hollow member is shown here, a solid, that is, a column member may be used, and the cylinder in one or more embodiments of the present invention has a concept including a column. Although an example of the cylinder is shown here, one or more embodiments of the present invention may adopt other shapes such as a rectangular cylinder, a conical shape, or a semi-spindle shape.

The swirl stopping surface 33 of the swirl stopping cylinder 32 is closed. The swirl stopping surface 33 is provided to face the downstream front end surface 14 of the boss 13 of the turbine wheel 10 with a minute gap therebetween, and the downstream front end surface 14 of the boss 13 is covered with the swirl stopping cylinder 32. Thus, an air flow is prevented from entering between the downstream front end surface 14 of the boss 13 and the swirl stopping surface 33 of the swirl stopping cylinder 32.

A generated swirl is triggered by a wall surface. For the turbine wheel 10, the swirl generated after passing through the turbine wheel 10 is triggered by the downstream front end surface 14 of the boss 13. Thus, the downstream front end surface 14 is not exposed to the flow path of the process gas G, thereby preventing generation of the swirl at the downstream front end surface 14 or preventing the generated swirl from affecting the downstream front end surface 14.

The swirl stopping cylinder 32 can achieve its function when located only near the downstream front end surface 14 of the boss 13. However, in one or more embodiments, in order to hold the swirl stopping cylinder 32 via the swirl preventing plate 35 in a predetermined position of the diffuser 30, the swirl stopping cylinder 32 is extended to an upstream side of the diffuser 30.

Next, the swirl preventing plates 35 circumferentially partition an inside of the diffuser 30 into four flow paths 37. Specifically, in one or more embodiments, the four swirl preventing plates 35 are prepared and radially placed around the swirl stopping cylinder 32.

Each swirl preventing plate 35 has a trapezoidal planar shape along an increasing opening diameter of the diffuser 30. For each swirl preventing plate 35, an outer end in a radial direction of the diffuser 30 is joined to an inner peripheral surface of the diffuser 30, and an inner end is joined to the swirl stopping cylinder 32. With this configuration, the swirl stopping cylinder 32 is held in a predetermined position of the diffuser 30.

As described above, in one or more embodiments, the swirl preventing plates 35 are provided to form the four partitioned flow paths 37 on the downstream side of the diffuser 30. Thus, the process gas G having passed through the flow path 31 on the upstream side forms a swirl flow, but when the swirl flow reaches the flow paths 37 independent of each other in a region in which the swirl preventing plates 35 are provided, the swirl preventing plates 35 impede and stop the swirl flow, thereby preventing generation of a swirl.

As such, the diffuser 30 according to one or more embodiments includes a pressure recovery region formed of the flow path 31 on the upstream side and a swirl flow stopping region formed of the flow paths 37 on the downstream side continuous with the pressure recovery region.

Figure 2:
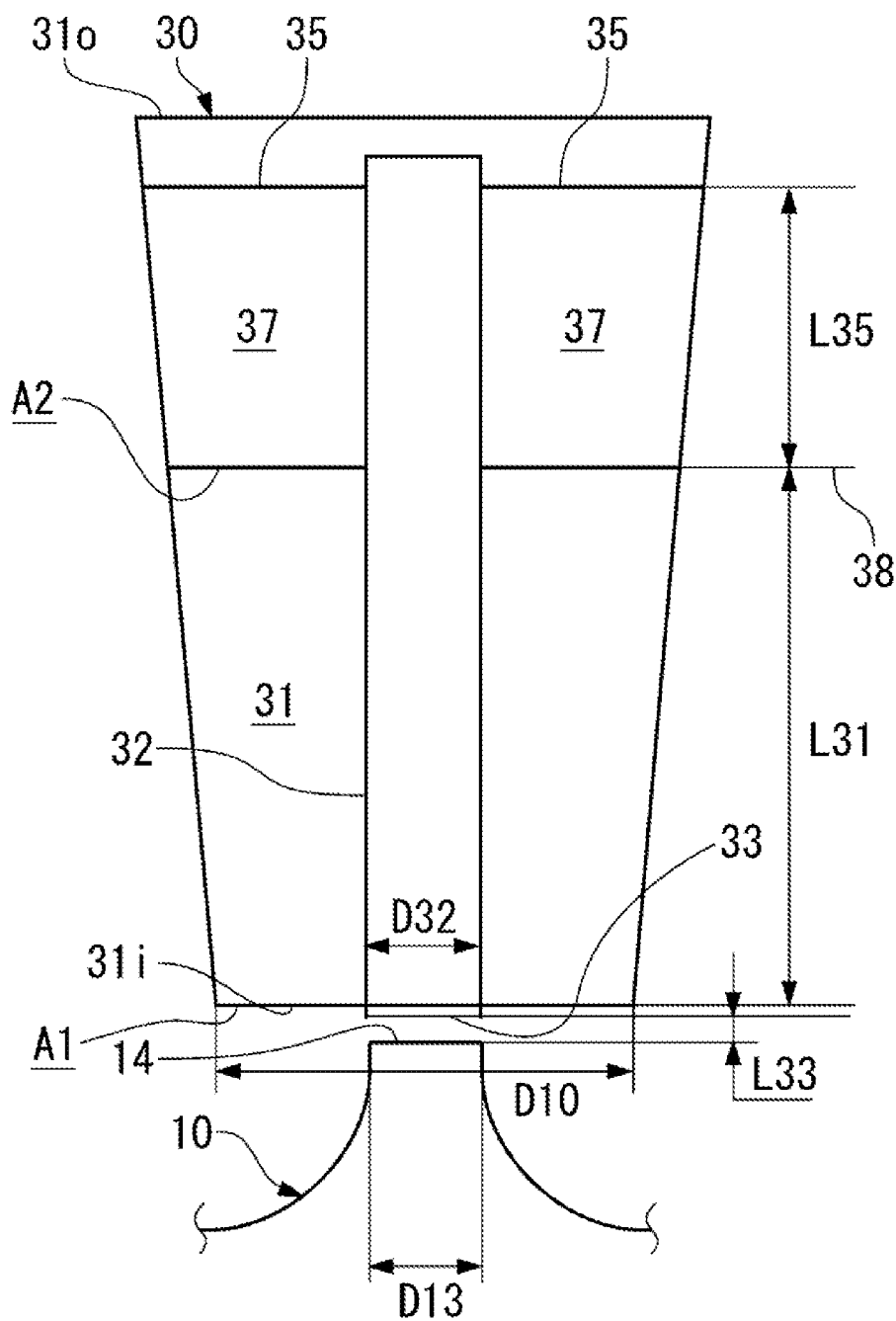
FIG. 2 shows dimensions of elements of the gas expander according to one or more embodiments.

Next, with reference to FIG. 2, examples of the swirl stopping cylinder 32 and the swirl preventing plate 35 in the gas expander 1 will be described.

First, a diameter D32 of a portion of the swirl stopping cylinder 32 facing the downstream front end surface 14 of the turbine wheel 10 and a diameter D13 of the downstream front end surface 14 of the boss 13 of the turbine wheel 10 are required to have the following relationship because the swirl stopping cylinder 32 is provided to cover the downstream front end surface 14 of the boss 13 as much as possible so as not to be exposed:

$$D32 \geq D13 \times 0.95 \qquad \text{Expression (1)}$$

However, the following relationship prevents the swirl stopping cylinder 32 from resisting the process gas G flowing through the turbine wheel 10 into the diffuser 30 and inhibiting a smooth flow of the process gas G:

$$D13 \times 1.2 \geq D32 \geq D13 \times 0.95 \qquad \text{Expression(2)}$$

The above relationships assume that the swirl stopping cylinder 32 and the turbine wheel 10 are placed coaxially with each other, however, in one or more present inventions, the swirl stopping cylinder 32 and the turbine wheel 10 may be decentered. In this case, the entire downstream front end surface 14 may be included in a range of a projection surface of the swirl stopping surface 33, and it is necessary that at least an area A33 of the swirl stopping surface 33 of the swirl stopping cylinder 32 is larger than an area A14 of the downstream front end surface 14 of the boss 13.

Also, an example in which the swirl stopping cylinder 32 has an axially uniform diameter D32 is shown here, however, any diameter may be adopted unless the function of the diffuser 30 is inhibited of a gradually increasing opening area reducing the flow speed of the passing process gas G and increasing and recovering the pressure. For example, the diameter may increase from the downstream front end surface 14 toward the upper end, or vice versa.

Next, a gap L33 between the swirl stopping surface 33 of the swirl stopping cylinder 32 and the downstream front end surface 14 of the boss 13 is as narrow as possible based on the function of the swirl stopping cylinder 32. However, interference of the swirl stopping cylinder 32 with the boss 13 due to whirling of the boss 13 caused by the rotation of the turbine wheel 10 or thermal expansion of the turbine wheel 10 should be avoided. Thus, in one or more embodiments, depending on the dimension of the gas expander 1, the gap L33 is 5 to 30 mm, 5 to 20 mm, or 5 to 15 mm.

Next, the shape of the swirl stopping surface 33 of the swirl stopping cylinder 32 will be described.

Figure 3A:
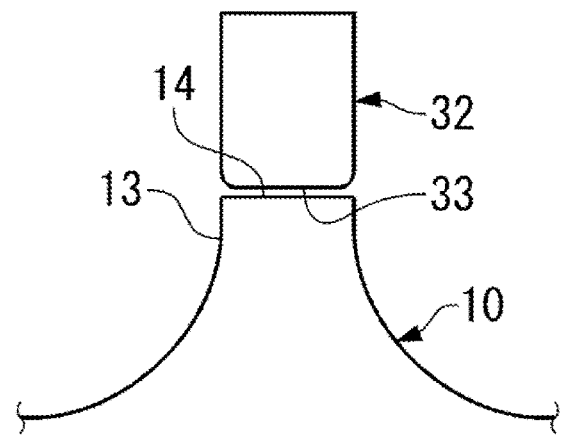
FIG. 3 shows examples of shapes of a swirl stopping cylinder of the gas expander according to one or more embodiments.
Figure 3B:
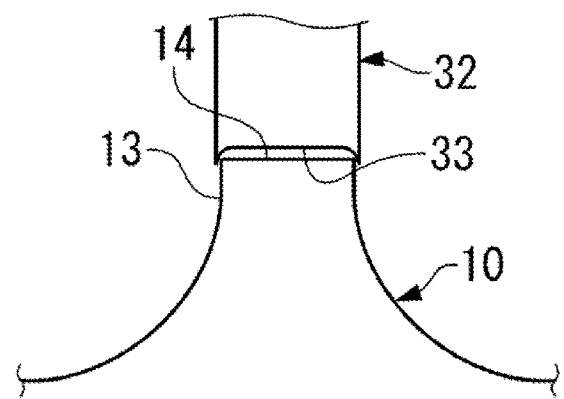
Figure 3C:
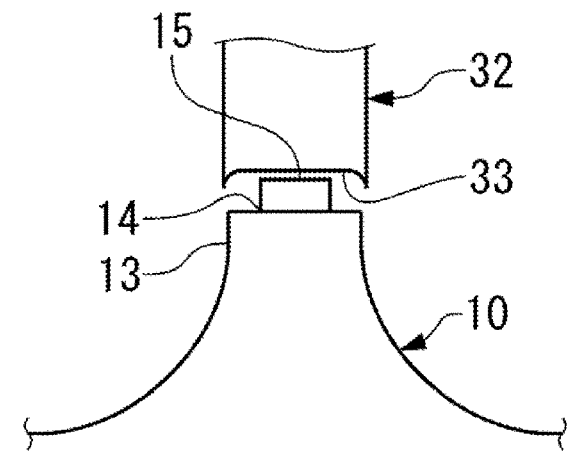

The swirl stopping cylinder 32 covers the downstream front end surface 14 of the boss 13. As shown in FIG. 3A, the swirl stopping cylinder 32 can achieve its function even if the swirl stopping surface 33 has a flat surface. However, as shown in FIG. 3B, the swirl stopping surface 33 is shaped so that a peripheral edge protrudes while an inner side thereof is recessed. Then, the swirl stopping cylinder 32 can cover not only the downstream front end surface 14 but also the outer peripheral surface of the boss 13 continuous with the downstream front end surface 14, thereby further reducing an exciting force applied on the rotating shaft 11 of the turbine wheel 10. Also, as shown in FIG. 3C, in a case where a nut 15 for securing the turbine wheel 10 is provided on the downstream front end surface 14 of the boss 13, the swirl stopping surface 33 is shaped so that the inner side is recessed so as to be able to cover the downstream front end surface 14 including the nut 15.

Next, with reference to FIG. 2, examples of the swirl preventing plate 35 will be described.

First, a position where the swirl preventing plate 35 is provided will be described.

The swirl preventing plate 35 partitions the flow path 31 in the diffuser 30 into the flow paths 37 to stop a swirl flow, and may be provided in any position of the diffuser 30 with consideration only for the function of the swirl preventing plate 35. However, it is difficult to achieve the function of the diffuser 30 of recovering pressure in the narrow flow paths 37 partitioned by the swirl preventing plates 35. Also, a swirl generated at the outlet of the turbine wheel 10 is said to have a swirl length 1.0 to 1.5 times longer than D10. On the other hand, the swirl preventing plate provided at a position where the swirl occurs has a great effect. However, the swirl preventing plate 35 interfering with the swirl may cause pressure loss, which may prevent a sufficient pressure recovery function of the diffuser 30 from being obtained. Thus, in one or more embodiments, the swirl preventing plate 35 is provided on the downstream side in the diffuser 30 to ensure the pressure recovery function of the diffuser 30. Specifically, the following Expression (3) is satisfied or the following Expression (4) is satisfied, where D10 is a diameter of the inlet $31i$ of the flow path 31 in the diffuser 30, and L31 is a distance from the inlet $31i$ to an end 38 on the upstream side of the swirl preventing plate 35:

$$L31 \geq D10 \times 0.75 \quad (3)$$

$$L31 \geq D10 \times 1.2 \quad (4)$$

Also, the pressure recovery function of the diffuser 30 is obtained by the flow path area increasing from the upstream side toward the downstream side. Thus, in one or more embodiments, as shown in FIG. 2, the swirl preventing plate 35 is placed such that the end 38 on the upstream side of the swirl preventing plate 35 is away from the inlet $31i$ to satisfy the following Expression (5), where A1 is a flow path area at the inlet $31i$ of the flow path 31, and A2 is a flow path area at the end 38 on the upstream side of the swirl preventing plate 35. A ratio above a certain level of the flow path area A2 at the end 38 on the upstream side of the swirl preventing plate 35 to the flow path area A1 at the inlet is ensured to maintain a pressure recovery rate of the diffuser 30. The flow path area A1 and the flow path area A2 are specified except a portion occupied by the swirl stopping cylinder 32.

$$A1 \times 1.6 \leq A2 \quad (5)$$

Next, for an axial dimension (length) L35 of the swirl preventing plate 35, it satisfies the following Expression (6).

$$L35 \geq D10 \times 0.45 \quad (6)$$

Next, for the number of the swirl preventing plates 35 provided, the four swirl preventing plates 35 are provided in the embodiments described above. This is because the four swirl preventing plates 35 having the same dimension are radially placed at regular intervals to facilitate positioning of the swirl stopping cylinder 32 coaxially with the rotating shaft 11, that is, at the center of the flow path 31 in the diffuser 30.

Figure 4A:
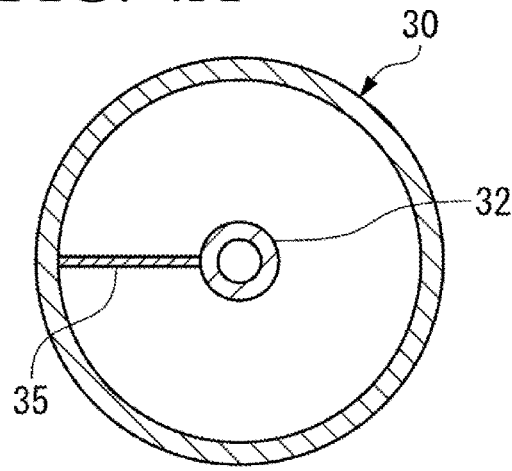
FIG. 4 shows examples of shapes of a swirl preventing plate of the gas expander according to one or more embodiments.
Figure 4B:
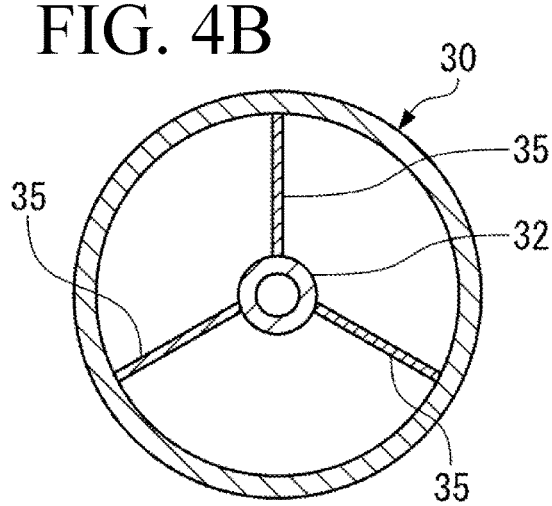
Figure 4C:
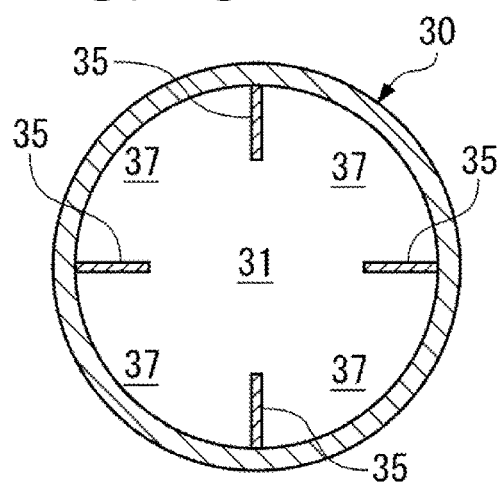

The function of the swirl preventing plate 35 of stopping the swirl flow is not only achieved by the four swirl preventing plates 35, but as shown in FIGS. 4A and 4B, a single (one) swirl preventing plate 35 or three swirl preventing plates 35 may be provided, or more than four swirl preventing plates 35 may be provided. Also, as shown in FIG. 4C, the swirl preventing plates 35 may protrude from the inner peripheral surface of the diffuser 30 to a predetermined radial range.

The swirl preventing plate 35 described above is provided in parallel with an axial direction, but not limited to this, the swirl preventing plate 35 may be tilted with respect to the axial direction. Further, the swirl preventing plate 35 has a flat surface, but not limited to this, may have a curved surface.

As described above, in the gas expander 1 according to one or more embodiments, the swirl stopping cylinder 32 that faces the downstream front end surface 14 of the turbine wheel 10 is provided to prevent the downstream front end surface 14 of the turbine wheel 10 from triggering the swirl flow. Also, the gas expander 1 includes the swirl preventing plate that circumferentially partitions the flow path 31 in the diffuser, thereby stopping the swirl flow even if generated. From the above, one or more embodiments can provide a gas expander 1 with further reduced vibration.

Also, in the gas expander 1 according to one or more embodiments, the swirl stopping cylinder 32 is secured to the swirl preventing plate 35, the swirl preventing plate 35 is secured to the diffuser 30, and thus the swirl stopping cylinder 32 is mounted to a predetermined position of the diffuser 30 via the swirl preventing plate 35. The swirl preventing plate 35 is used to mount the swirl stopping cylinder 32 to the diffuser 30. Thus, there is no need to prepare a separate special member for mounting the swirl stopping cylinder 32, and there is no need for a mounting operation using the member, thereby reducing cost including work burden.

In the gas expander 1 according to one or more embodiments, the flow path 31 in the diffuser 30 includes the pressure recovery region on the upstream side and the swirl flow stopping region on the downstream side continuous with the pressure recovery region. This can stop the swirl flow while ensuring the pressure recovery function of the diffuser 30. The swirl flow stopping region radially partitions the flow path in the diffuser 30, thereby sufficiently ensuring the function of the swirl preventing plate 35.

Embodiments of the present invention have been described. The components listed in the embodiments may be chosen or changed to other components without departing from the gist of the present invention.

Figure 5:
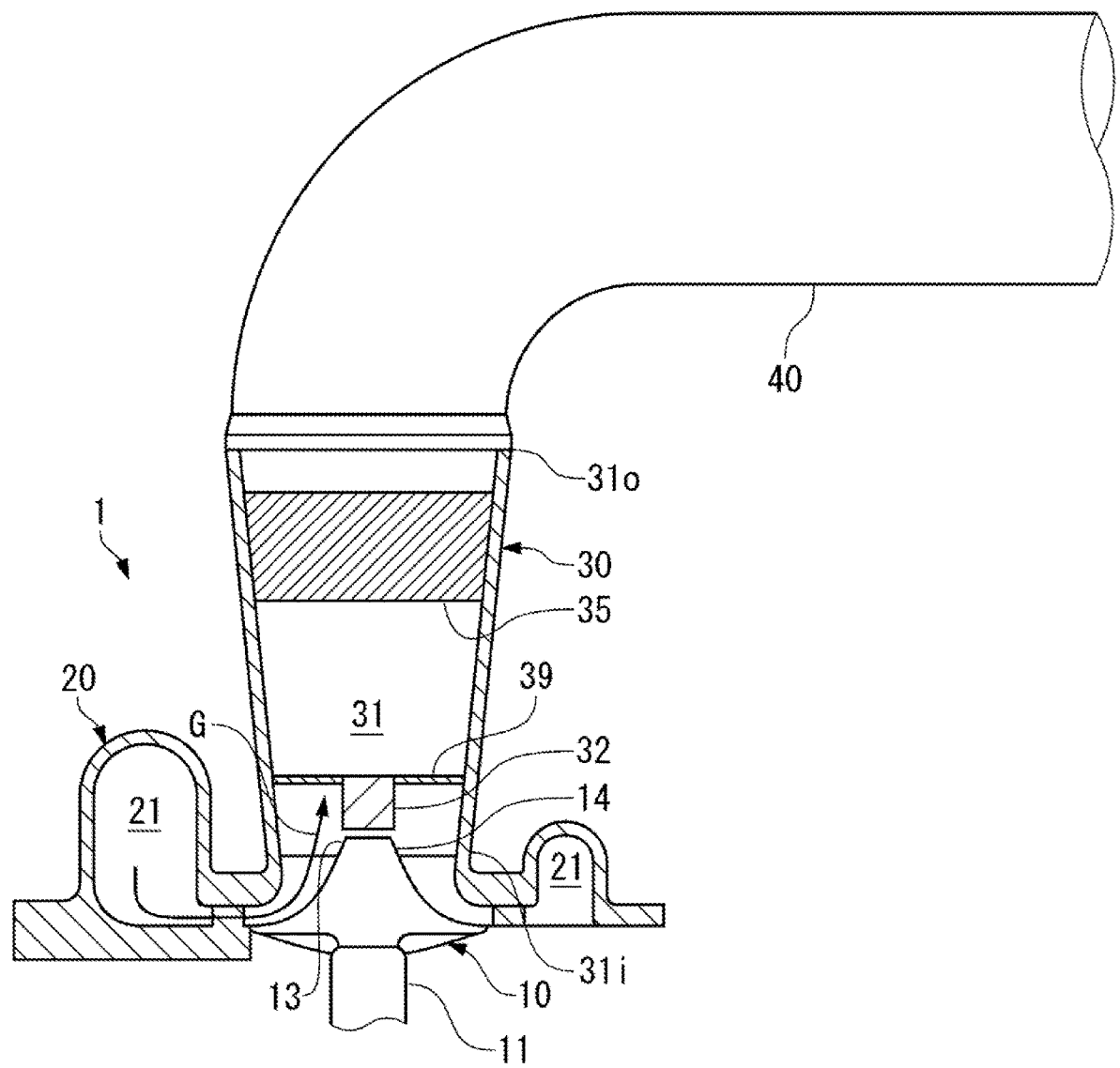
FIG. 5 shows a variant of the gas expander according to one or more embodiments.

For example, in the gas expander 1 described above, the swirl stopping cylinder 32 is supported in the diffuser 30 via the swirl preventing plate 35. However, as shown in FIG. 5, for example, the swirl stopping cylinder 32 may be supported in the diffuser 30 using a rod-like support 39 independently of the swirl preventing plate 35. In this case, the swirl preventing plate 35 radially partitions the flow path 31 in the diffuser 30 without via the swirl stopping cylinder 32.

REFERENCE SIGNS LIST 1 gas expander
10 turbine wheel
11 rotating shaft
13 boss
14 front end surface
15 nut 20 casing
21 swirl chamber
30 diffuser
31 flow path
31*i* inlet
31*o* outlet
32 swirl stopping cylinder
33 swirl stopping surface
34 rear end surface
35 swirl preventing plate
37 flow path
38 end
39 support
40 pipe
G process gas Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A gas expander comprising:
a casing where a swirl chamber is formed, wherein a gas to be expanded passes through the swirl chamber;
a turbine wheel that is housed in the casing and rotationally driven by the gas, wherein the gas that rotationally drives the turbine wheel has passed through the swirl chamber and expanded;
a diffuser that:
is mounted to the casing in a direction of a rotating shaft of the turbine wheel, and
includes a flow path where the gas, having passed through the turbine wheel, flows in the direction of the rotating shaft,
a swirl stopper that:
is disposed in the diffuser,
faces a downstream front end surface of a boss of the turbine wheel that faces the flow path, and
includes a closed swirl stopping surface that is disposed to face the downstream front end surface of the boss with a gap between the closed swirl stopping surface and the downstream front end surface; and
a swirl preventing plate that circumferentially partitions the flow path,
wherein $L31 \geq D10 \geq 0.75$ is satisfied, where D10 is a diameter of an inlet of the flow path and L31 is a distance from the inlet to an end on the upstream side of the swirl preventing plate.

2. The gas expander according to claim 1, wherein:
the swirl preventing plate is provided on a downstream side of the flow path,
the flow path includes:
a pressure recovery region on an upstream side, and
a swirl flow stopping region on the downstream side continuous with the pressure recovery region.

3. The gas expander according to claim 2, wherein $L31 \geq D10 \times 0.75$ is satisfied, where D10 is a diameter of an inlet of the flow path and L31 is a distance from the inlet to an end on the upstream side of the swirl preventing plate.

4. The gas expander according to claim 2, wherein $L31 \geq D10 \times 1.2$ is satisfied, where D10 is a diameter of an inlet of the flow path and L31 is a distance from the inlet to an end on the upstream side of the swirl preventing plate.

5. The gas expander according to claim 2, wherein:
in the diffuser, a flow path area increases from the upstream side toward the downstream side,
the swirl preventing plate is disposed so that the end on the upstream side of the swirl preventing plate is away from the inlet, and
$A1 \times 1.6 \leq A2$ is satisfied, where A1 is the flow path area at the inlet of the flow path and A2 is the flow path area at the end on the upstream side of the swirl preventing plate.

6. The gas expander according to claim 2, wherein $L35 \geq D10 \times 0.45$ is satisfied, where L35 is an axial dimension of the swirl preventing plate and D10 is a diameter of the inlet of the flow path.

7. The gas expander according to claim 1, wherein $L31 \geq D10 \times 1.2$ is satisfied, where D10 is a diameter of an inlet of the flow path and L31 is a distance from the inlet to an end on the upstream side of the swirl preventing plate.

8. The gas expander according to claim 1, wherein:
in the diffuser, a flow path area increases from the upstream side toward the downstream side,
the swirl preventing plate is disposed so that the end on the upstream side of the swirl preventing plate is away from the inlet, and $A1 \times 1.6 \leq A2$ is satisfied, where A1 is the flow path area at the inlet of the flow path and A2 is the flow path area at the end on the upstream side of the swirl preventing plate.

9. The gas expander according to claim 1, wherein:
the gas expander includes a plurality of swirl preventing plates, and the plurality of swirl preventing plates radially partition the flow path.

10. The gas expander according to claim 1, wherein:
the swirl stopper includes a cylindrical member disposed coaxially with the rotating shaft of the turbine wheel, and $D32 \geq D13 \times 0.95$ is satisfied, where D32 is a diameter of the closed swirl stopping surface of the swirl stopper and D13 is a diameter of the downstream front end surface of the boss of the turbine wheel.

11. The gas expander according to claim 10, wherein $D13 \times 1.2 \geq D32 \geq D13 \times 0.95$ is satisfied.

12. The gas expander according to claim 1, wherein:
the swirl stopper is secured to the swirl preventing plate and the swirl preventing plate is secured to the diffuser, and
the swirl stopper is mounted to a predetermined position of the diffuser via the swirl preventing plate.

13. The gas expander according to claim 12, wherein:
the gas expander includes a plurality of swirl preventing plates, and
the plurality of the swirl preventing plates radially partition the flow path in the diffuser around the swirl stopper.

14. The gas expander according to claim 1, wherein:
the gas expander further includes a plurality of swirl preventing plates, and
the plurality of swirl preventing plates radially partition the flow path.

15. A gas expander comprising:
a casing where a swirl chamber is formed, wherein a gas to be expanded passes through the swirl chamber;
a turbine wheel that is housed in the casing and rotationally driven by the gas, wherein the gas that rotationally drives the turbine wheel has passed through the swirl chamber and expanded;
a diffuser that:
is mounted to the casing in a direction of a rotating shaft of the turbine wheel, and includes a flow path where the gas, having passed through the turbine wheel, flows in the direction of the rotating shaft,
a swirl stopper that:
  is disposed in the diffuser,
  faces a downstream front end surface of a boss of the turbine wheel that faces the flow path, and
  includes a closed swirl stopping surface that is disposed to face the downstream front end surface of the boss with a gap between the closed swirl stopping surface and the downstream front end surface; and
a swirl preventing plate that circumferentially partitions the flow path,
wherein $L35 \geq D10 \times 0.45$ is satisfied, where L35 is an axial dimension of the swirl preventing plate and D10 is a diameter of the inlet of the flow path.

16. A gas expander comprising:
a casing where a swirl chamber is formed, wherein a gas to be expanded passes through the swirl chamber;
a turbine wheel that is housed in the casing and rotationally driven by the gas, wherein the gas that rotationally drives the turbine wheel has passed through the swirl chamber and expanded;
a diffuser that:
  is mounted to the casing in a direction of a rotating shaft of the turbine wheel, and includes a flow path where the gas, having passed through the turbine wheel, flows in the direction of the rotating shaft,
a swirl stopper that:
  is disposed in the diffuser,
  faces a downstream front end surface of a boss of the turbine wheel that faces the flow path, and
  includes a closed swirl stopping surface that is disposed to face the downstream front end surface of the boss with a gap between the closed swirl stopping surface and the downstream front end surface; and
a swirl preventing plate that circumferentially partitions the flow path, wherein in the swirl stopper, the closed swirl stopping surface has a protruding peripheral edge and an inner side recessed from the peripheral edge, and
the swirl stopper covers the downstream front end surface of the boss and an outer peripheral surface of the turbine wheel continuous with the downstream front end surface of the boss.

* * * * *